(12) United States Patent
Morioka

(10) Patent No.: US 7,604,419 B2
(45) Date of Patent: Oct. 20, 2009

(54) OPTICAL MODULE AND OPTICAL CONNECTOR HAVING SAME

(75) Inventor: Shimpei Morioka, Kanagawa (JP)

(73) Assignee: Enplas Corporation, Saitama (JP)

( * ) Notice: Subject to any disclaimer, the term of this patent is extended or adjusted under 35 U.S.C. 154(b) by 995 days.

(21) Appl. No.: 10/767,695

(22) Filed: Jan. 29, 2004

(65) Prior Publication Data
US 2004/0184743 A1  Sep. 23, 2004

(30) Foreign Application Priority Data
Feb. 4, 2003  (JP)  ............... P2003-026656

(51) Int. Cl.
*G02B 6/36* (2006.01)
(52) U.S. Cl. .......................... 385/93; 385/88
(58) Field of Classification Search .............. None
See application file for complete search history.

(56) References Cited

U.S. PATENT DOCUMENTS

| 5,181,265 | A | * | 1/1993 | Nishiwaki et al. | ............. 385/33 |
| 5,526,455 | A | * | 6/1996 | Akita et al. | ................... 385/93 |
| 6,595,701 | B2 | * | 7/2003 | Terada et al. | ................... 385/93 |
| 6,607,309 | B2 | * | 8/2003 | Kuhn et al. | ..................... 385/93 |
| 6,742,938 | B2 | * | 6/2004 | Tanaka et al. | ................. 385/94 |
| 6,817,782 | B2 | * | 11/2004 | Togami et al. | ................ 385/92 |
| 6,942,398 | B2 | * | 9/2005 | Morioka | ...................... 385/93 |

FOREIGN PATENT DOCUMENTS

| JP | 10-3000994 | 11/1998 |
| JP | 2002-43675 | 2/2002 |

* cited by examiner

*Primary Examiner*—John D. Lee
*Assistant Examiner*—Kevin S. Wood
(74) *Attorney, Agent, or Firm*—Bachman & LaPointe, P.C.

(57) ABSTRACT

An optical module capable of preventing the efficiency of optical coupling from deteriorating even if temperature varies. The optical module 1 has a holder 2 and an aspherical lens 11, which are formed of a plastic so as to be integrated with each other. The holder 2 has a cylindrical portion 8 which engages a photoelectric transfer element package 3. The photoelectric transfer element package 3 has a flange portion 15 which butts the open end face 16 of the cylindrical portion 8. The flange portion 15 is bonded to the open end face 16 of the cylindrical portion 16, and a gap is formed between the outer peripheral surface 18 of the cap 12 of the photoelectric transfer element package 3 and the inner peripheral surface of the cylindrical portion 8.

6 Claims, 4 Drawing Sheets

OPTICAL MODULE AND OPTICAL CONNECTOR HAVING SAME

BACKGROUND OF THE INVENTION

1. Field of the Invention

The present invention generally relates to an optical module and an optical connector having the same. More specifically, the invention relates to an optical module for optical fiber communication, and an optical connector having the same.

2. Description of the Prior Art

A typical optical module for optical fiber communication comprises a photoelectric transfer element package (e.g., a package housing therein a semiconductor light emitting element, such as a semiconductor laser, and a semiconductor light receiving element, such as a photodiode), a ferrule, a lens and a holder for housing therein them.

In such an optical module, a photoelectric transfer element (a semiconductor light emitting element or a semiconductor light receiving element) in the photoelectric transfer element package is optically coupled with an optical fiber of the ferrule via the lens.

For example, in optical modules disclosed in Japanese Patent Laid-Open Nos. 10-300994 and 2002-43675, the photoelectric transfer element package, the spherical lens and the optical fiber of the ferrule are separated, so that an aligning operation for aligning the optical axes of the parts with each other is carried out when the parts are housed in the holder.

However, as described above, in the prior art disclosed in Japanese Patent Laid-Open Nos. 10-300994 and 2002-43675, the photoelectric transfer element package, the spherical lens and the optical fiber of the ferrule are separated, and the aligning operation must be carried out so as to align the optical axes of the parts with each other when the parts are installed in the holder. Since it is not easy to carry out the aligning operation, there is a problem in that operation efficiency is not good.

SUMMARY OF THE INVENTION

It is therefore an object of the present invention to eliminate the aforementioned problems and to provide an optical module capable of enhancing the efficiency of an aligning operation during assembly to facilitate assembly, and an optical connector having the same.

In order to accomplish the aforementioned and other objects, according to one aspect of the present invention, an optical module comprises: a holder having an optical fiber mounting hole on one side in axial directions thereof, and a cylindrical portion on the other side in the axial directions thereof; a ferrule fitted into the optical fiber mounting hole of the holder; a photoelectric transfer element received in the cylindrical portion of the holder so as to engage therewith; and a lens, arranged between the optical fiber mounting hole and cylindrical portion of the holder, for causing the ferrule to be optically coupled with the photoelectric transfer element package, the lens having a smoothly curved surface which projects toward the photoelectric transfer element package, wherein the lens and the holder are formed of a plastic so as to be integrated with each other.

In this optical module, the photoelectric transfer element package may have a flange portion which is bonded and fixed to an open end face of the cylindrical portion, and a gap may be formed between an outer peripheral surface of the photoelectric transfer element package and an inner peripheral surface of the cylindrical portion, the variation ($\Delta d2$) of a distance ($d2$) from a vertex of the lens to a focal point thereof in accordance with temperature change being substantially equal to the variation ($\Delta L$) of an axial length ($L$) from the vertex of the lens to the open end face of the cylindrical portion in accordance with temperature change.

In the above described optical module, the cylindrical portion may have an open end portion which is bonded and fixed to the photoelectric transfer element package, and a gap may be formed between an outer peripheral surface of the photoelectric transfer element package and an inner peripheral surface of the cylindrical portion, the variation ($\Delta d2$) of a distance ($d2$) from a vertex of the lens to a focal point thereof in accordance with temperature change being substantially equal to the variation ($\Delta L$) of an axial length ($L$) from the vertex of the lens to a portion, in which the open end portion of the cylindrical portion is bonded and fixed to the photoelectric transfer element package, in accordance with temperature change.

In the above described optical module, the cylindrical portion may have an open end face which is bonded and fixed to the photoelectric transfer element package via an annular ring, and a gap may be formed between an outer peripheral surface of the photoelectric transfer element package and an inner peripheral surface of the cylindrical portion, the variation ($\Delta d2$) of a distance ($d2$) from a vertex of the lens to a focal point thereof in accordance with temperature change being substantially equal to the variation ($\Delta L$) of an axial length ($L$) from the vertex of the lens to a portion, in which the open end face of the cylindrical portion is bonded and fixed to the photoelectric transfer element package, in accordance with temperature change.

In the above described optical module, the cylindrical portion may have an open end portion which detachably engages the photoelectric transfer element package, and a gap may be formed between an outer peripheral surface of the photoelectric transfer element package and an inner peripheral surface of the cylindrical portion, the variation ($\Delta d2$) of a distance ($d2$) from a vertex of the lens to a focal point thereof in accordance with temperature change being substantially equal to the variation ($\Delta L$) of an axial length ($L$) from the vertex of the lens to a portion, in which the open end portion of the cylindrical portion engages the photoelectric transfer element package, in accordance with temperature change. In this case, one of the open end portion of the cylindrical portion and the photoelectric transfer element package may have a protrusion, and the other of the open end portion of the cylindrical portion and the photoelectric transfer element package may have a recessed portion engageable with the protrusion.

According to another aspect of the present invention, an optical connector comprises: the above described optical module; and a housing for receiving and holding therein the optical module.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiment of the present invention will be described below in detail.

Figure 1:
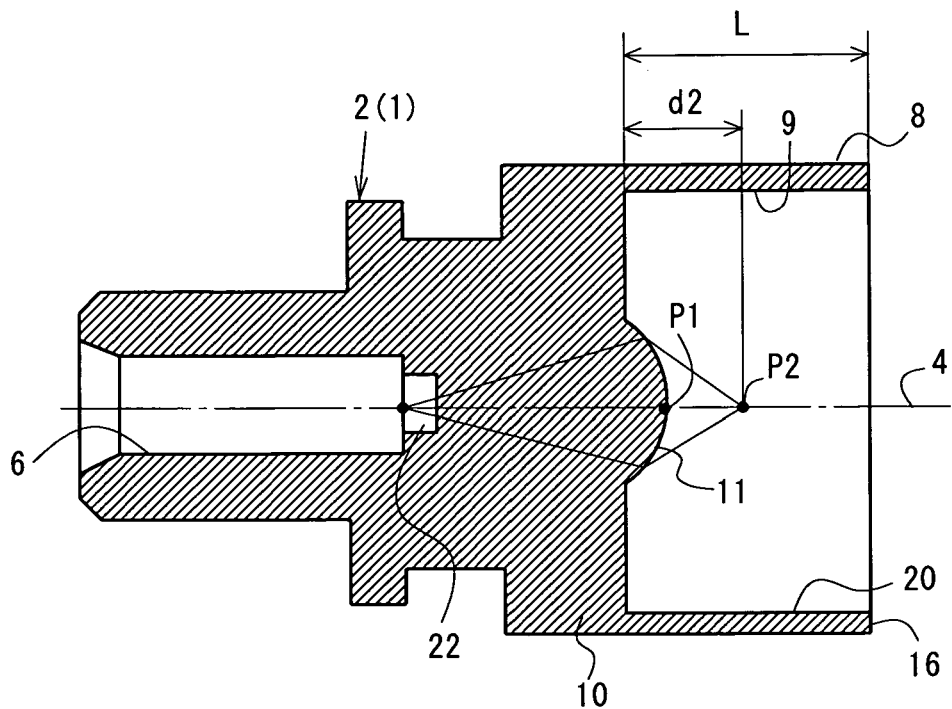
FIG. 1 is a longitudinal section of a holder in the first preferred embodiment of an optical module according to the present invention.
Figure 2:
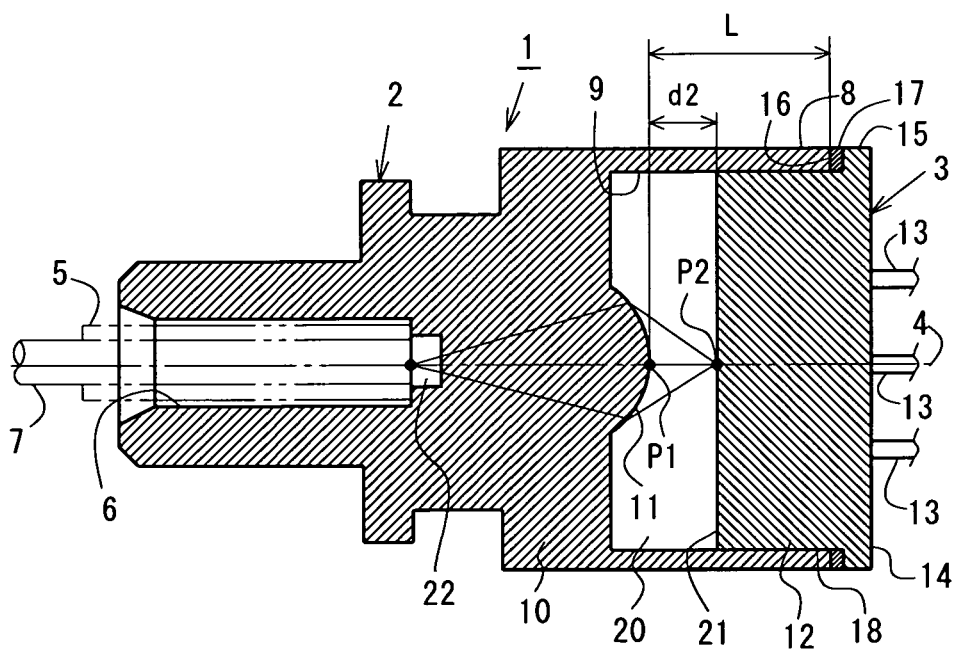
FIG. 2 is a longitudinal section of the first preferred embodiment of an optical module according to the present invention, which schematically shows a state that a photoelectric transfer element package is mounted on a holder.

FIGS. 1 and 2 are sectional views for explaining a preferred embodiment of an optical module 1 according to the present invention. FIG. 1 is a longitudinal section of a holder 2 of the optical module 1, and FIG. 2 is a longitudinal section schematically showing a state that a photoelectric transfer element package 3 is mounted on the holder 2.

As shown in these figures, the holder 2 is formed by injection-molding a phototransparent plastic (e.g., PEI (polyethylene isophthalate), PC (polycarbonate), PMMA (polymethylmethacrylate)). One end of the holder 2 in directions parallel to the axis 4 thereof has an optical fiber mounting hole 6 capable of detachably engaging a ferrule 5. The optical fiber mounting hole 6 is open on the side of the one end of the holder 2 in directions parallel to the axis 4 thereof, and is capable of housing and holding therein the ferrule 5. The other end of the holder 2 in directions parallel to the axis 4 thereof has a cylindrical portion 8 capable of housing and holding therein a photoelectric transfer element package (a package housing therein a semiconductor light emitting element or a semiconductor light receiving element as a photoelectric transfer element) 3.

Figure 6:
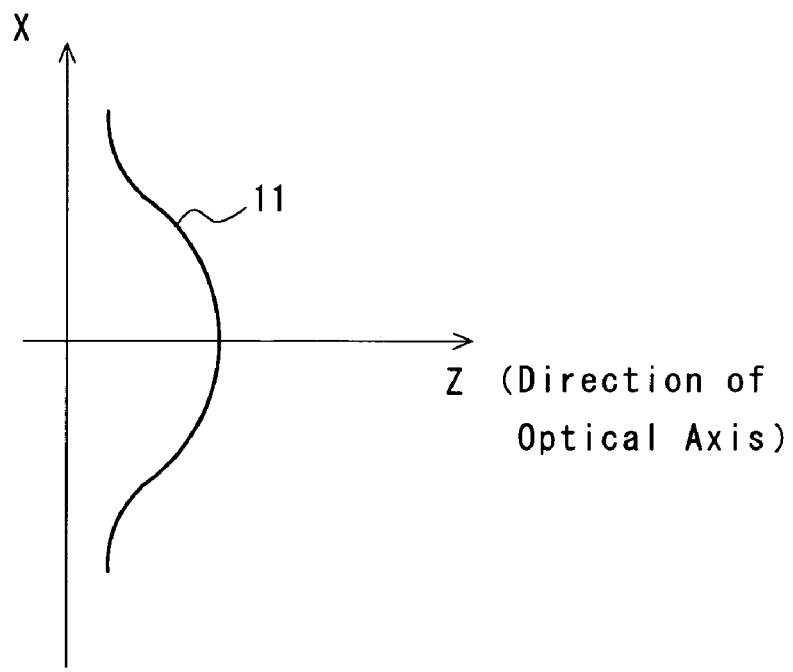
FIG. 6 is a diagram showing a cross section of an aspherical lens.

The holder 2 has an aspherical lens 11 which is formed on a partition wall 10 between the cylindrical portion 8 and the optical fiber mounting hole 6 so as to be integrated with the partition wall 10 of the holder 2 and which projects toward the photoelectric transfer element package 3 housed in the cylindrical portion 8. The aspherical lens 11 is formed so as to have an optical axis being coincident with the axis 4 of the holder 2, and has a shape expressed by the following expression (see FIG. 6):

$$Z = \frac{\frac{X^2}{R}}{1 + \sqrt{1 - (K+1)\frac{X^2}{R}}} + aX^4 + bX^6 + cX^8 + dX^{10}$$

wherein Z denotes a dimension in directions of the optical axis, and X denotes a dimension from the optical axis, K denoting a conical coefficient, R denoting a paraxial radius of curvature, and a through d denoting aspherical coefficients.

The photoelectric transfer element package 3 is designed to emit light from a semiconductor light emitting element (e.g., a semiconductor laser) (not shown) housed in a substantially cylindrical cap 12 or to receive light a semiconductor light receiving element (e.g., a photodiode) (not shown) housed in the cap 12. The cap 12 has a substantially annular flange portion 15 which projects from the outer periphery of the cap 12 on the side of a cap end face 14 from which leads 13 of the photoelectric transfer element package 3 protrude. The flange portion 15 of the photoelectric transfer element package 3 is designed to butt an open end face 16 of the cylindrical portion 8 of the holder 2 to be bonded and fixed thereto by an adhesive 17. The substantially cylindrical outer peripheral face 18 of the cap 12 of the photoelectric transfer element package 3 is designed to be received in the hole 20 of the cylindrical portion 8 of the holder 2 so as to form a gap between the substantially cylindrical outer peripheral face 18 and the inner peripheral surface 9 of the cylindrical portion 8 of the holder 2. Although the holder 2 is made of a plastic, the cap 12 is made of a metal having a smaller amount of thermal deformation than that of a plastic.

In this preferred embodiment, the dimension of the holder 2 is determined so as to decrease the displacement of a focal point P2 of the aspherical lens 11 from a surface (a light emitting surface or a light receiving surface) 21 of the photoelectric transfer element package 3 even if the temperature of the optical module 1 varies. In FIG. 2, the surface 21 of the photoelectric transfer element package 3 is schematically shown as the light emitting surface of the semiconductor light emitting element or the light receiving surface of the semiconductor light receiving element, which is housed therein, for convenience of explanation. Therefore, in FIG. 2, the focal point P2 of the aspherical lens 11 is coincident with the light emitting surface of the semiconductor light emitting element or the light receiving surface of the semiconductor light receiving element, which is housed in the photoelectric transfer element package 3.

That is, the dimension (d2) from the vertex P1 of the aspherical lens 11 to the focal point P2 of the aspherical lens 11 varies in accordance with the refractive index and thickness of the lens which vary in accordance with temperature change. For example, if temperature rises by Δt, the dimension (d2) varies to (d2+Δd2). The axial length (L) from the vertex P1 of the aspherical lens 11 to the open end face 16 of the cylindrical portion 8 increases or decreases due to expansion or contraction of the plastic which is the material of the holder 2. For example, if temperature rises by Δt, the length (L) varies to (L+ΔL) although the variation (ΔL) changes in accordance with the coefficient of linear thermal expansion of the plastic and with temperature change. On the other hand, it is assumed that the cap 12 of a metal (e.g., SUS) to engage the holder 2 is not deformed due to temperature change since a ratio (α1/α2) of the coefficient of linear expansion α1 of the cap 12 to the coefficient of linear expansion α2 of the holder 2 of a plastic (e.g., PEI) is about 0.12 to 0.18. As a result, if it is set so that ΔL=Δd2, the position of the focal point P2 of the aspherical lens 11 can be approximately coincident with a position on the surface 21 of the photoelectric transfer element package 3, so that it is possible to decrease the displacement of the focal point P2 of the aspherical lens 11 from the surface 21 of the photoelectric transfer element package 3.

As described above, in the optical module 1, if it is set so that ΔL=Δd2, the position of the focal point P2 of the aspherical lens 11 is substantially coincident with the position on the surface 21 of the photoelectric transfer element package 3, so that the efficiency of optical coupling can be enhanced. Furthermore, if the material, shape and focal length (d2) of the aspherical lens 11 is suitably determined, Δd2 is univocally determined in accordance with temperature change Δt, since the refractive index and the coefficient of linear expansion are inherent values of the material of the aspherical lens 11.

Therefore, the dimension (L) which is set so that ΔL=Δd2, i.e. the axial length (L) of the cylindrical portion 8 from the vertex P1 of the aspherical lens 11 to the bonding portion can be derived from the following expression:

$$L = \frac{\Delta L}{\alpha \cdot \Delta T} = \frac{\Delta d2}{\alpha \cdot \Delta T}$$

wherein α denotes a coefficient of linear expansion, and ΔT denotes a variation in temperature.

Furthermore, in order to prevent the tip of the optical fiber 7 of the ferrule 5 from contacting the holder 2 to be damaged, the bottom of the optical fiber mounting hole 6 of the holder 2 has a relief hole 22 which has a smaller diameter than that of the optical fiber mounting hole 6.

With this construction, according to the optical module 1 in this preferred embodiment, the aspherical lens 11 and the holder 2 can be formed so as to be integrated with each other, so that it is not required to align the optical axis of the aspherical lens 11 with the axis 4 of the holder 2. Therefore, the assembly operation for the optical module 1 can be simplified to improve the productivity of the optical module 1.

According to this preferred embodiment, it is possible to decrease the number of parts, and it is possible to improve productivity as described above, so that the price of the optical module 1 can be decreased.

According to this preferred embodiment, since the aspherical lens 11 and the holder 2 can be formed so as to be integrated with each other, there is not the possibility that dust enters a space between the aspherical lens 11 and the photoelectric transfer element package 3, so that it is possible to surely carry out optical communication. However, according to a conventional optical module that a separate lens is bonded to a holder, there is the possibility that dust enters a space between the lens and a photoelectric transfer element package from a gap in a portion in which irregular adhesion occurs.

According to the optical module in this preferred embodiment, even if ambient temperature varies, the position of the focal point P2 of the aspherical lens 11 is substantially coincident with the position on the surface 21 of the photoelectric transfer element package 3 to enhance the efficiency of optical coupling, so that it is possible to efficiently carry out optical communication.

According to this preferred embodiment, since it is possible to decrease the displacement of the focal point P2 of the aspherical lens 11 from the surface 21 of the photoelectric transfer element package 3 due to temperature change, so that it is possible to increase the power of the lens. On the other hand, if the displacement of the focal length of the lens due to temperature change is large, the efficiency of optical coupling deteriorates, so that it is not possible to increase the power of the lens.

According to this preferred embodiment, since the power of the aspherical lens 11 can be increased as described above, it is possible to allow light beams having a wider emission angle to be incident on the optical fiber 7 than that in a case where a lens having a smaller power is used, so that it is possible to transmit strong light.

The optical module 1 in this preferred embodiment can increase the power of the aspherical lens 11 as described above. Therefore, when a single mode optical fiber is used, it is possible to more efficiently carry out optical communication than a case where a lens having a smaller power is used.

Figure 7:
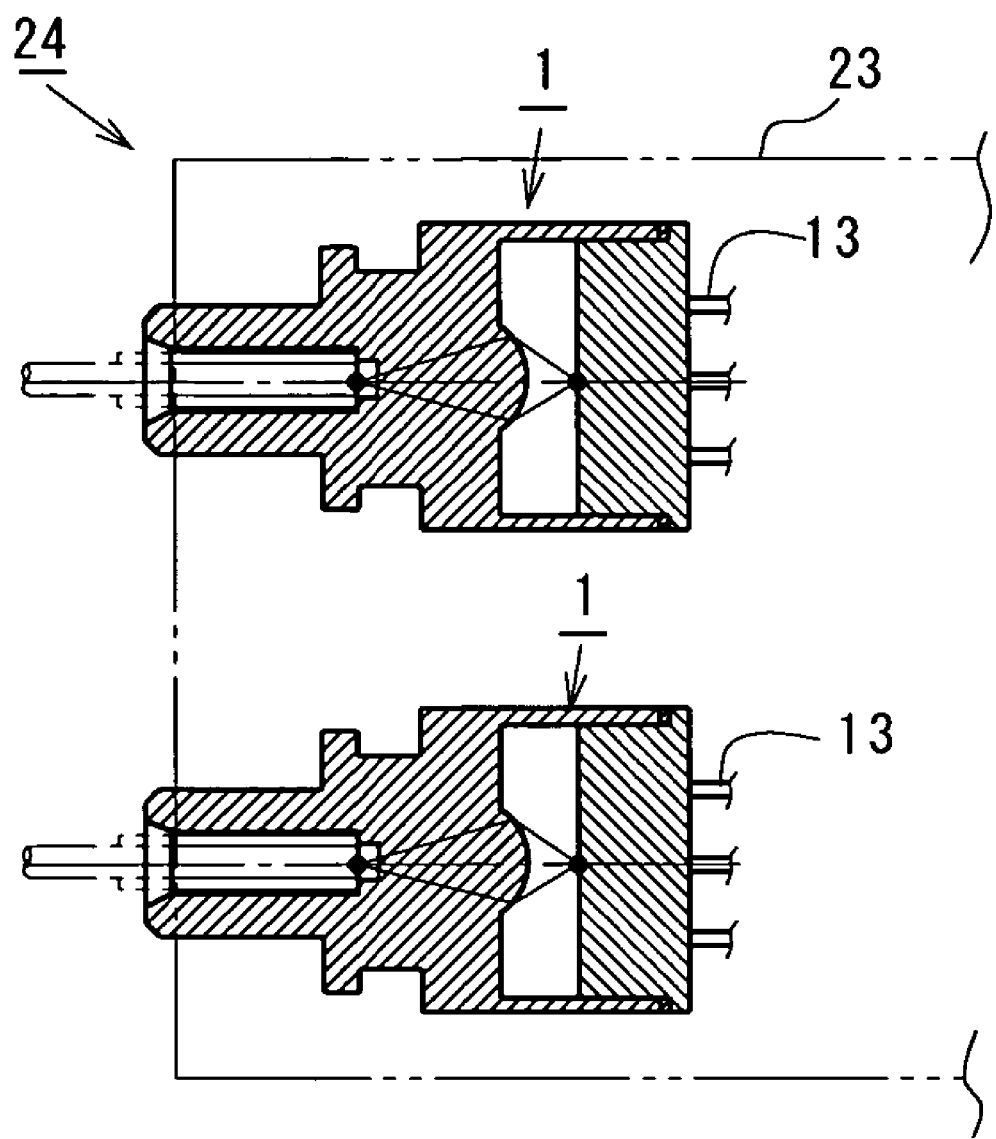
FIG. 7 is a schematic diagram of an optical connector using optical modules according to the present invention.

As shown in, e.g., FIG. 7, the optical module 1 shown in FIG. 2 is housed in a housing 23 as a light emitting or receiving optical module 1, and the leads 13 are soldered on an electric substrate (not shown) in the housing 23 to form an optical connector 24.

In particular, the optical module 1 in this preferred embodiment can be effectively used as a light emitting optical module 1 since it is possible to increase the power of the aspherical lens 11.

Figure 3:
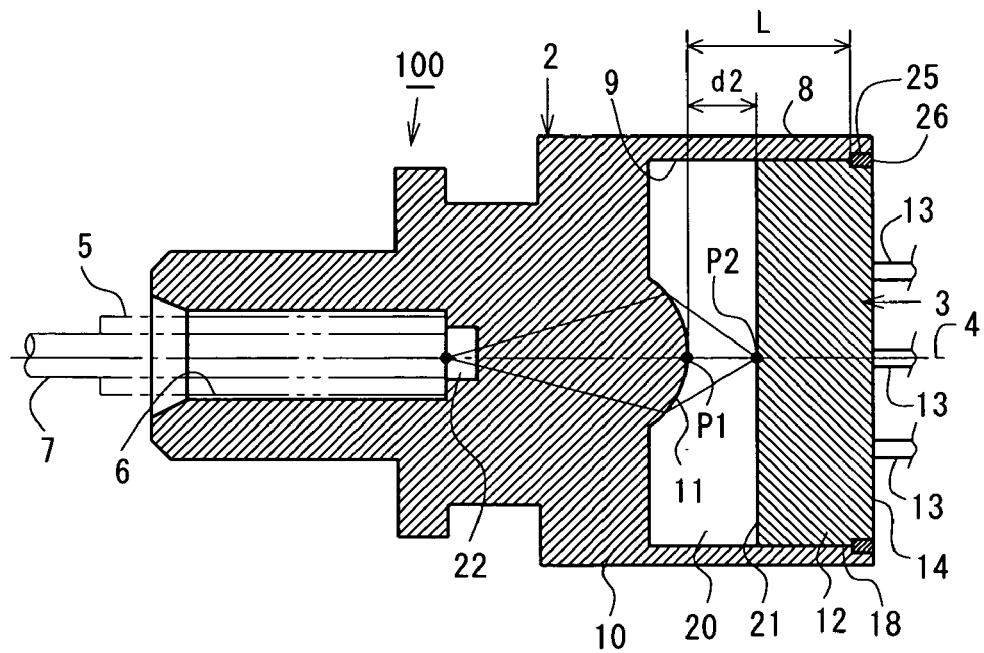
FIG. 3 is a longitudinal section of the second preferred embodiment of an optical module according to the present invention, which schematically shows a state that a photoelectric transfer element package is mounted on a holder.

FIG. 3 is a longitudinal section for explaining the second preferred embodiment of an optical module 100 according to the present invention, which schematically shows a state that a photoelectric transfer element package 3 is mounted on a holder 2. In this preferred embodiment, the same reference numbers are given to portions, which are substantially the same as those of the optical module 1 in the above described first preferred embodiment, to omit repeated explanation thereof.

In the optical module 100 in this preferred embodiment, a bonding portion 25, which is formed in the open end portion of the cylindrical portion 8 of the holder 2 and in a portion engaging the cap 12 of the photoelectric transfer element package 3, is bonded and fixed to the cap 12 by an adhesive 26. A gap is formed between the inner peripheral surface 9 of the cylindrical portion 8 and the outer peripheral surface 18 of the cap 12, except for the bonding portion 25, so as to allow thermal deformation of the cylindrical portion 8.

The optical module 100 in this preferred embodiment can obtain the same advantageous effects as those of the optical module 1 in the above described first preferred embodiment.

Figure 4:
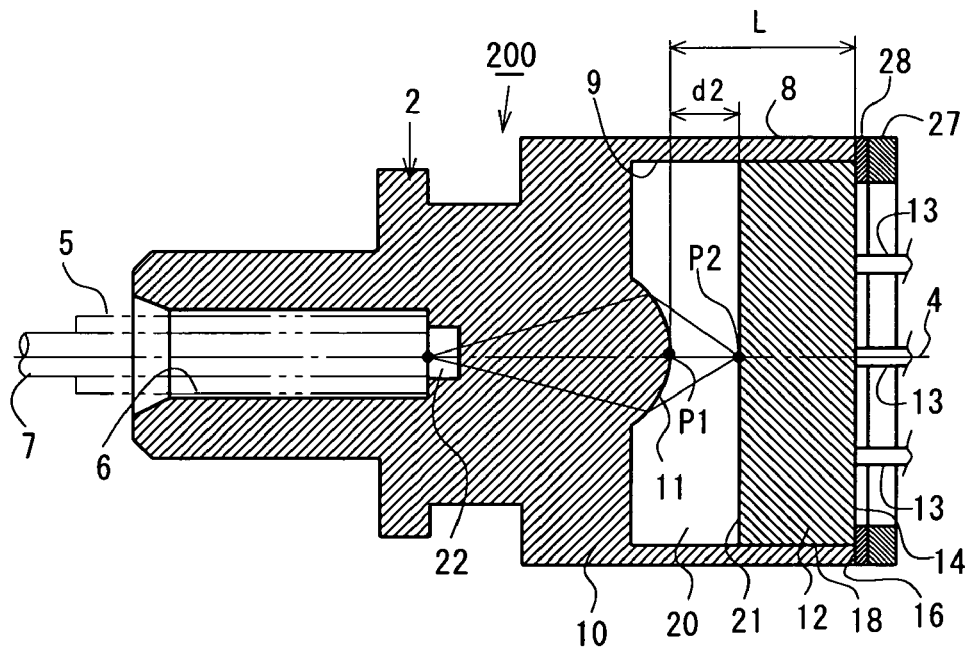
FIG. 4 is a longitudinal section of the third preferred embodiment of an optical module according to the present invention, which schematically shows a state that a photoelectric transfer element package is mounted on a holder.

FIG. 4 is a longitudinal section for explaining the third preferred embodiment of an optical module 200 according to the present invention, which schematically shows a state that a photoelectric transfer element package 3 is mounted on a holder 2. In this preferred embodiment, the same reference numbers are given to portions, which are substantially the same as those of the optical module 1 in the above described first preferred embodiment, to omit repeated explanation thereof.

In the optical module 200 in this preferred embodiment, the cap 12 is fitted in the cylindrical portion 8 with a gap so that the cap end face 14 of the photoelectric transfer element package 3 is arranged on the same plane as that of the open end face 16 of the cylindrical portion 8 of the holder 2. To the open end face 16 of the cylindrical portion 8 and the outer peripheral end portion of the cap end face 14, an annular ring 27 is fixed by an adhesive 28. A gap is formed between the inner peripheral surface 9 of the cylindrical portion 8 and the outer peripheral surface 18 of the cap 12 so as to allow thermal deformation of the cylindrical portion 8.

The optical module 200 in this preferred embodiment can obtain the same advantageous effects as those of the optical module 1 in the above described first preferred embodiment.

Figure 5:
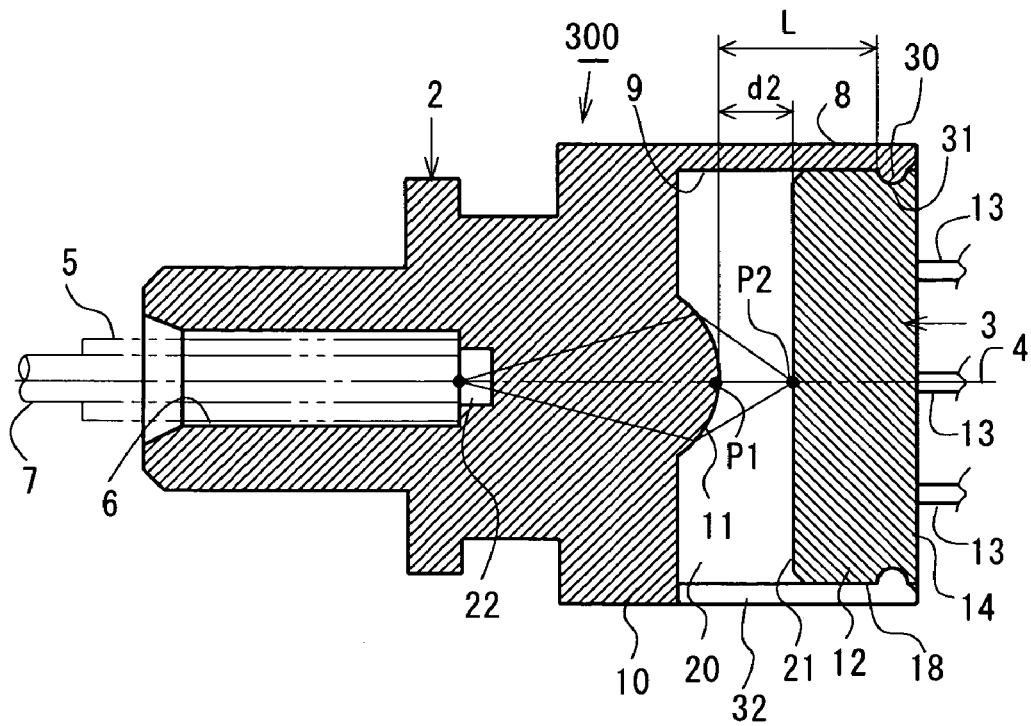
FIG. 5 is a longitudinal section of the fourth preferred embodiment of an optical module according to the present invention, which schematically shows a state that a photoelectric transfer element package is mounted on a holder.

FIG. 5 is a longitudinal section for explaining the fourth preferred embodiment of an optical module 300 according to the present invention, which schematically shows a state that a photoelectric transfer element package 3 is mounted on a holder 2. In this preferred embodiment, the same reference numbers are given to portions, which are substantially the same as those of the optical module 1 in the above described first preferred embodiment, to omit repeated explanation thereof.

In the optical module 300 in this preferred embodiment, protrusions 30 are formed on the inner peripheral surface of the cylindrical portion 8 of the holder 2 on the open end side thereof. On the other hand, in the outer peripheral surface 18 of the cap 12 of the photoelectric transfer element package 3 to be fitted into the cylindrical portion 8 of the holder 2, recessed portions 31 engageable with the protrusions 30 of the holder 2 are formed. The cylindrical portion 8 of the holder 2 has a plurality of slits 32 extending from the open end to root portion thereof along the axis 4 so that the cylindrical portion 8 can be elastically deformed (deformed so as to increase its diameter) to allow the protrusions 30 to engage the recessed portions 31 of the cap 12. In the optical module 300 with this construction, the photoelectric transfer element package 3 can be detachably fixed to the holder 2 by fitting the cap 12 into the cylindrical portion 8 of the holder 2 to cause the protrusions 30 of the cylindrical portion 8 to engage the recessed portions 31 of the cap 12.

In this preferred embodiment, the axial length (L) of the cylindrical portion 8 is a distance between the vertex P1 of the aspherical lens 11 and the protrusions 30. In this preferred embodiment, a gap is formed between the inner peripheral surface 9 of the cylindrical portion 8 of the holder 2 and the outer peripheral surface 18 of the cap 12 so as to allow thermal deformation of the cylindrical portion 8. While the protrusions 30 have been formed on the cylindrical portion 8 and the recessed portions 31 have been formed in the cap 12 in this preferred embodiment, recessed portions may be formed in the cylindrical portion 8, and protrusions engageable with the recessed portions of the cylindrical portion 8 may be formed on the cap 12.

With this construction, the optical module 300 in this preferred embodiment can obtain the same advantageous effects as those in the above described first preferred embodiment.

As described above, according to the present invention, the aspherical lens and the holder are formed so as to be integrated with each other, so that it is not required to align the optical axis of the aspherical lens with the axis of the holder. Therefore, the assembly operation for the optical module can be simplified to improve the productivity of the optical module.

According to the present invention, it is possible to decrease the number of parts, and it is possible to improve productivity as described above, so that the price of the optical module can be decreased.

According to the present invention, even if ambient temperature varies, it is possible to decrease the displacement of the focal point of the aspherical lens from the surface of the photoelectric transfer element package to enhance the efficiency of optical coupling, so that it is possible to efficiently carry out optical communication.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optical module comprising:
a holder having an optical fiber mounting hole on one side in axial directions thereof, and a cylindrical portion on the other side in the axial directions thereof;
a ferrule fitted into the optical fiber mounting hole of the holder for mounting an optical fiber in the optical fiber mounting hole;
a photoelectric transfer element received in the cylindrical portion of the holder so as to engage therewith; and
a lens, arranged between the optical fiber mounting hole and cylindrical portion of the holder, for causing the optical fiber to be optically coupled with the photoelectric transfer element package, said lens having a smoothly curved surface which projects toward the photoelectric transfer element package,
wherein said lens and said holder are formed of a plastic so as to be integrated with each other,
wherein said photoelectric transfer element package has a flange portion which is bonded and fixed to an open end face of said cylindrical portion, and a gap is formed between an outer peripheral surface of said photoelectric transfer element package and an inner peripheral surface of said cylindrical portion, and
wherein a variation ($\Delta d2$) of a distance ($d2$) from a vertex of said lens to a focal point thereof in accordance with temperature change is substantially equal to a variation ($\Delta L$) of an axial length (L) from the vertex of said lens to the open end face of said cylindrical portion in accordance with temperature change.

2. An optical module comprising:
a holder having an optical fiber mounting hole on one side in axial directions thereof, and a cylindrical portion on the other side in the axial directions thereof;
a ferrule fitted into the optical fiber mounting hole of the holder for mounting an optical fiber in the optical fiber mounting hole;
a photoelectric transfer element received in the cylindrical portion of the holder so as to engage therewith; and
a lens, arranged between the optical fiber mounting hole and cylindrical portion of the holder, for causing the optical fiber to be optically coupled with the photoelectric transfer element package, said lens having a smoothly curved surface which projects toward the photoelectric transfer element package,
wherein said lens and said holder are formed of a plastic so as to be integrated with each other,
wherein said cylindrical portion has an open end portion which is bonded and fixed to said photoelectric transfer element package, and a gap is formed between an outer peripheral surface of said photoelectric transfer element package and an inner peripheral surface of said cylindrical portion, and
wherein a variation ($\Delta d2$) of a distance ($d2$) from a vertex of said lens to a focal point thereof in accordance with temperature change is substantially equal to a variation ($\Delta L$) of an axial length (L) from the vertex of said lens to a portion, in which said open end portion of said cylindrical portion is bonded and fixed to said photoelectric transfer element package, in accordance with temperature change.

3. An optical module comprising:
a holder having an optical fiber mounting hole on one side in axial directions thereof, and a cylindrical portion on the other side in the axial directions thereof;

a ferrule fitted into the optical fiber mounting hole of the holder for mounting an optical fiber in the optical fiber mounting hole;

a photoelectric transfer element received in the cylindrical portion of the holder so as to engage therewith; and a lens, arranged between the optical fiber mounting hole and cylindrical portion of the holder, for causing the optical fiber to be optically coupled with the photoelectric transfer element package, said lens having a smoothly curved surface which projects toward the photoelectric transfer element package, wherein said lens and said holder are formed of a plastic so as to be integrated with each other, wherein said cylindrical portion has an open end face which is bonded and fixed to said photoelectric transfer element package via an annular ring, and a gap is formed between an outer peripheral surface of said photoelectric transfer element package and an inner peripheral surface of said cylindrical portion, and wherein a variation ($\Delta d2$) of a distance ($d2$) from a vertex of said lens to a focal point thereof in accordance with temperature change is substantially equal to a variation ($\Delta L$) of an axial length ($L$) from the vertex of said lens to a portion, in which said open end face of said cylindrical portion is bonded and fixed to said photoelectric transfer element package, in accordance with temperature change.

4. An optical module comprising:

a holder having an optical fiber mounting hole on one side in axial directions thereof, and a cylindrical portion on the other side in the axial directions thereof;

a ferrule fitted into the optical fiber mounting hole of the holder for mounting an optical fiber in the optical fiber mounting hole;

a photoelectric transfer element received in the cylindrical portion of the holder so as to engage therewith; and a lens, arranged between the optical fiber mounting hole and cylindrical portion of the holder, for causing the optical fiber to be optically coupled with the photoelectric transfer element package, said lens having a smoothly curved surface which projects toward the photoelectric transfer element package, wherein said lens and said holder are formed of a plastic so as to be integrated with each other, wherein said cylindrical portion has an open end portion which detachably engages said photoelectric transfer element package, and a gap is formed between an outer peripheral surface of said photoelectric transfer element package and an inner peripheral surface of said cylindrical portion, and wherein a variation ($\Delta d2$) of a distance ($d2$) from a vertex of said lens to a focal point thereof in accordance with temperature change is substantially equal to a variation ($\Delta L$) of an axial length ($L$) from the vertex of said lens to a portion, in which said open end portion of said cylindrical portion engages said photoelectric transfer element package, in accordance with temperature change.

5. An optical module as set forth in claim 4, wherein one of said open end portion of said cylindrical portion and said photoelectric transfer element package has a protrusion, and the other of said open end portion of said cylindrical portion and said photoelectric transfer element package has a recessed portion engageable with said protrusion.

6. An optical connector comprising:

an optical module as set forth in any one of claims 1 through 5; and a housing for receiving and holding therein said optical module.

* * * * *

UNITED STATES PATENT AND TRADEMARK OFFICE
CERTIFICATE OF CORRECTION

PATENT NO.        : 7,604,419 B2
APPLICATION NO. : 10/767695
DATED             : October 20, 2009
INVENTOR(S)      : Shimpei Morioka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1178 days.

Signed and Sealed this

Fifth Day of October, 2010

David J. Kappos
*Director of the United States Patent and Trademark Office*